Jan. 17, 1939.  S. M. HANLEY  2,144,290
AUTOMATIC REGULATING APPARATUS FOR CURRENT SUPPLY SYSTEMS
Filed Aug. 26, 1935  3 Sheets-Sheet 2
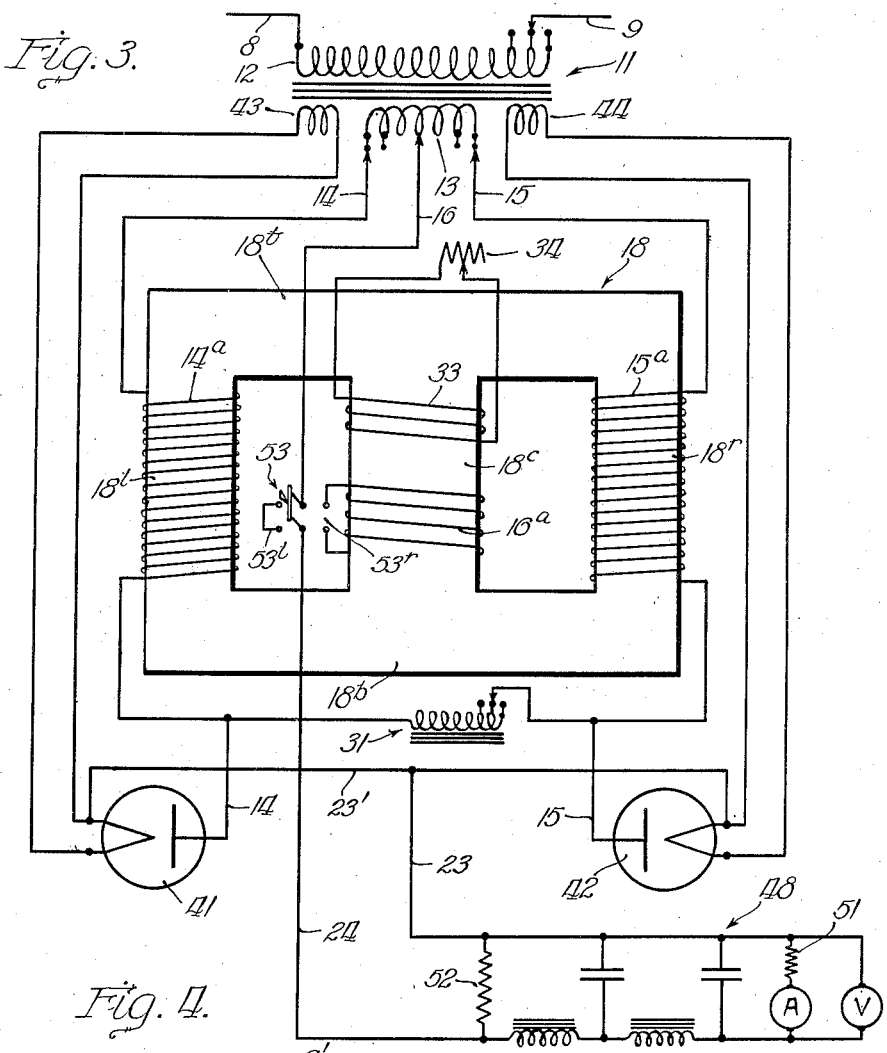
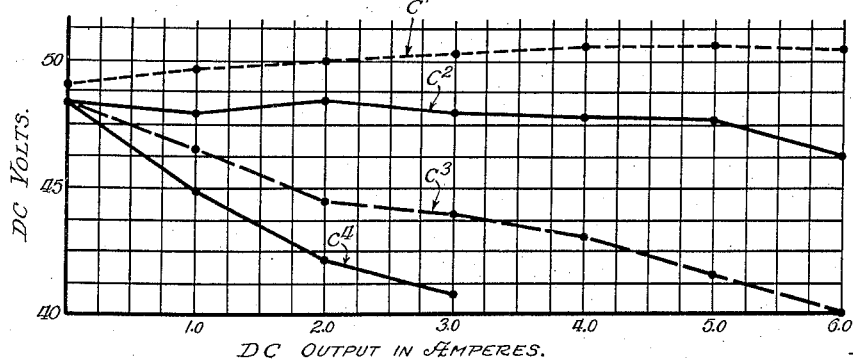
Inventor:
Stanley M. Hanley
By: Brown, Jackson, Boettcher & Dienner
Attys.

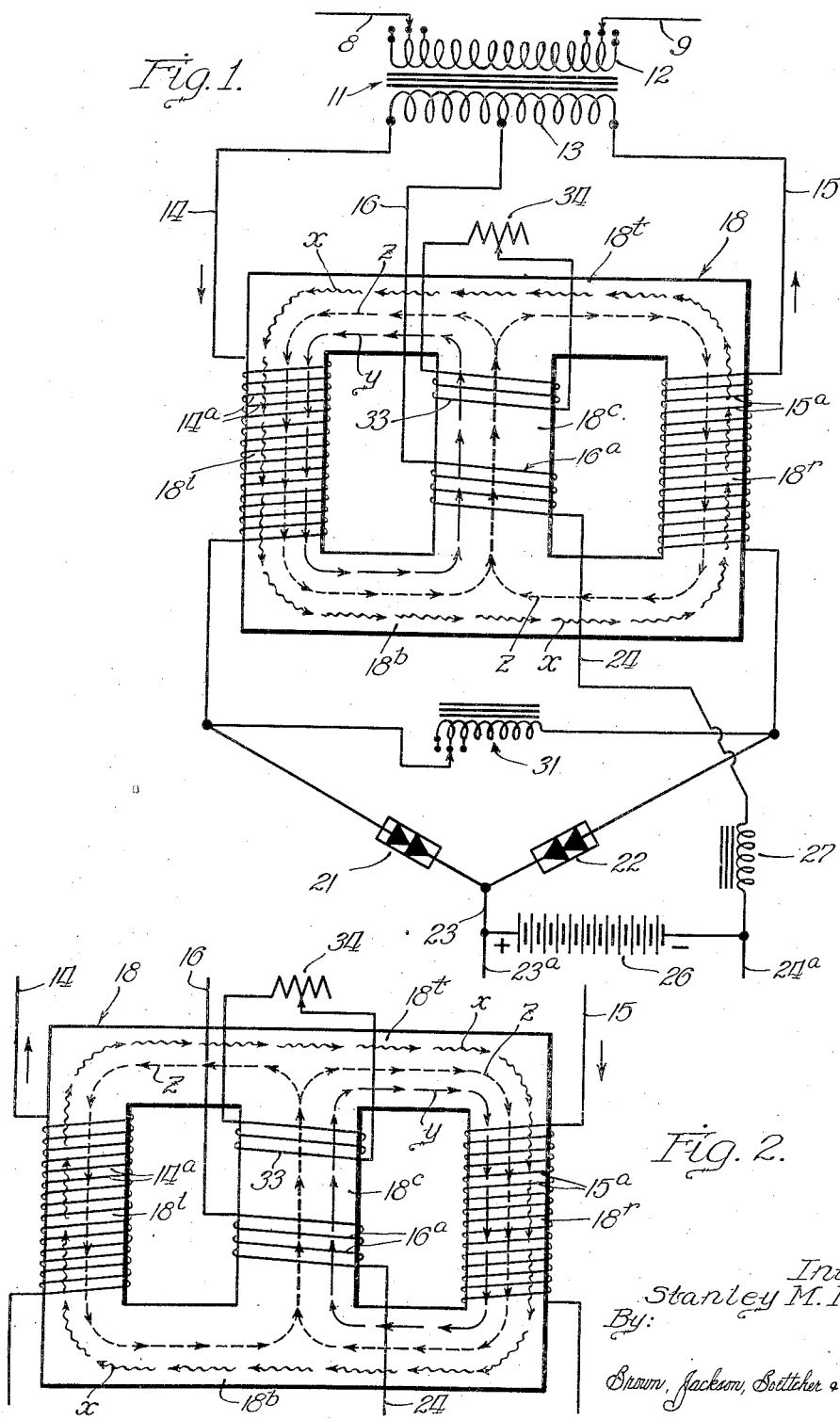

Jan. 17, 1939. S. M. HANLEY 2,144,290
AUTOMATIC REGULATING APPARATUS FOR CURRENT SUPPLY SYSTEMS
Filed Aug. 26, 1935 3 Sheets-Sheet 3

Inventor:
Stanley M. Hanley
By:
Brown, Jackson, Boettcher & Dienner
Attys.

Patented Jan. 17, 1939

2,144,290

UNITED STATES PATENT OFFICE 2,144,290

AUTOMATIC REGULATING APPARATUS FOR CURRENT SUPPLY SYSTEMS

Stanley M. Hanley, Detroit, Mich., assignor of one-half to The North Electric Manufacturing Company, Galion, Ohio, a corporation of Ohio, and one-fourth to Donald R. Middleton, Detroit, Mich.

Application August 26, 1935, Serial No. 37,798

2 Claims. (Cl. 175—363)

The present invention relates to automatic regulating apparatus for current supply systems. The general object of the invention is to provide an improved system and apparatus which will function in response to different load demands on a load circuit to control automatically the voltage impressed on the load circuit. The invention has particular application to rectifying systems wherein the alternating current of the supply circuit is rectified for the load circuit, as for example in battery charging systems and in battery eliminator systems.

The regulating function is performed by varying the magnetic permeability of a reactor comprising a multiple leg core structure which carries windings energized by alternating current and by direct current. Another object of the invention is to provide improved means for controlling the flow of the alternating current fluxes in said core structure and for effecting an improved correlation of the fluxes therein to secure the desired control of the voltage effective on the load circuit.

The invention is of important practical utility in connection with isolated automatic telephone exchanges or any type of load which requires direct current for intermittent duty operation. Such a load, particularly in the case of a telephone system, may vary widely, as from substantially no load during certain parts of the night to a maximum for the busiest hours of the day or evening. A direct current supply system under such circumstances must accommodate itself not only to the load but also to the characteristics of the battery. Such isolated telephone stations have no person in attendance and only periodical inspection, as, for example, monthly, the attendant inspects the condition of the cells and supplies any necessary make-up water. For such requirements, it is necessary that the rate of recharging the battery be reduced to such a value that gassing is a minimum. A certain amount of gassing is desirable to stir up the electrolyte so that it does not stratify, but any excessive gassing which would only waste water is to be avoided. The characteristics of the system should therefore be such as to allow the battery to assist in supplying the demand for peak loads, but on the other hand, the rectifier must cut in and recharge the battery as soon as peak loads are passed and then cut out or substantially cease charging as the battery becomes substantially fully charged. The system of the present invention accomplishes the above and other purposes in a highly satisfactory manner.

Other objects and advantages of the invention will appear from the following detail description of certain preferred embodiments thereof. In the accompanying drawings illustrating such embodiments:—

Figure 1 is a diagrammatic view of one form of the improved apparatus and system of the invention;

Figure 2 is a diagrammatic view of the reactor of this embodiment, showing the relation of the fluxes therein during the other alternation in the alternating current supply circuit;

Figure 3 is a diagrammatic view, similar to Figure 1, showing another form of the invention;

Figure 4 is a typical curve showing the regulation obtainable by this latter embodiment.

Figure 5:
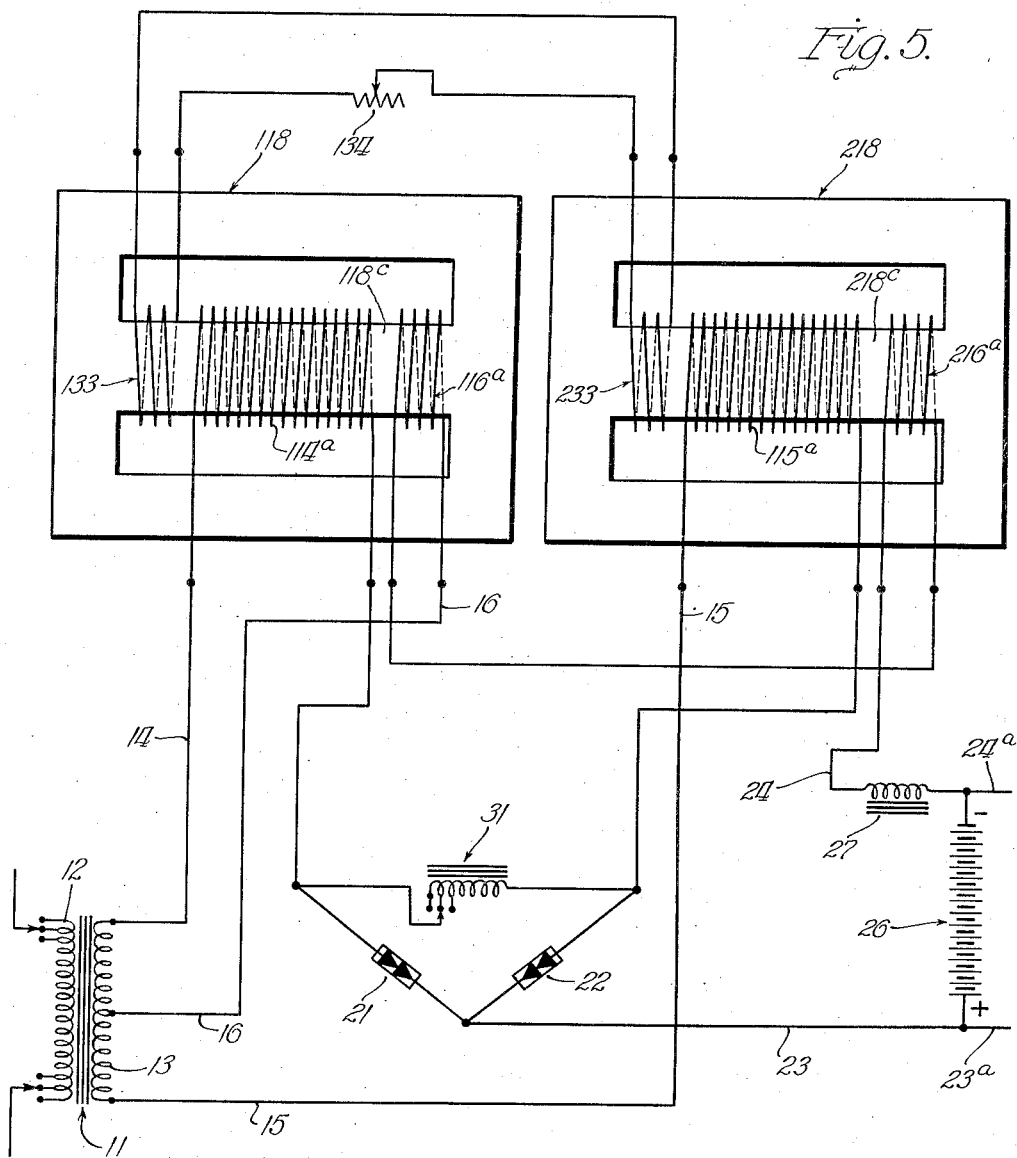
Figure 5 is a diagrammatic view of another form of the invention.

The conductors 8 and 9 represent an alternating current supply circuit of commercial frequency. A transformer 11 has its primary winding 12 connected to the supply circuit 8, 9. Taps are preferably provided at both ends of the primary winding for voltage adjusting purposes. The two end terminals of the secondary winding 13 connect with conductors 14 and 15 leading to coils 14a and 15a on the end legs of a three-legged reactor. A center tap of the secondary winding 13 connects through conductor 16 with a coil 16a on the center leg of this reactor. The reactor is designated 18 in its entirety, and comprises a core structure including a left leg 18l, a right leg 18r, a center leg 18c, and top and bottom yokes 18t and 18b joining the ends of the three legs.

The conductor 14 continues from the other end of the coil 14a to a rectifying unit 21; and, correspondingly, the conductor 15 continues from the end of the coil 15a to a similar rectifying unit 22. These rectifying units may be of the tube type or of the dry disc type. In the arrangement illustrated, I have shown these rectifiers as being of the copper oxide type. The corresponding end terminals of these rectifying units are connected to a conductor 23 which represents one side of the rectified current load circuit. The other side 24 of this load circuit is completed through the central coil 16a and conductor 16 to the mid-point of the transformer secondary 13. The load circuit is shown as serving to charge a storage battery 26, the apparatus being of particular advantage in this regard for telephone exchanges, direct current signaling systems, etc. In this embodiment, the battery is connected by the leads 23a and 24a to a telephone exchange. Such exchange may be an isolated automatic telephone exchange having no attendants and being given only periodical inspection, as, for example, once a month. It will, of course, be understood that any similar load may be employed instead of the telephone system. The conductor 23 is the positive side of the load circuit and the conductor 24 is the negative side. A conventional ripple suppressing choke 27 is preferably included in series in the load circuit. Where it is desired to use the apparatus in the capacity of a battery eliminator, the load circuit will include any suitable filter system, as will be later described.

Connected in shunt across the conductors 14 and 15 at a point between the controlling reactor 18 and the rectifying units 21, 22 is a shunt impedance 31. This impedance may be inductive, capacitive, or resistive, or any combination thereof, although I preferably employ an inductive reactance, as shown. In the inductive form shown, this shunt is preferably designed so that the impedance variation therein from no-load or light-load to full-load is approximately in the ratio of 3 to 1.

The amount of alternating current flux flowing through the central leg 18c of the reactor core is arranged to be controlled by a low resistance coil 33 mounted on the central leg. The ends of this coil are connected to an adjustable resistance 34. Reducing the effective resistance of said coil, for a greater current flow therethrough, reduces or minimizes the flow of alternating current flux through the central leg 18c, and, conversely, increasing the effective resistance of said coil increases the amount of alternating current flux passing through the central leg.

I find it preferable in practice to make the two end coils 14a and 15a of substantially the same number of turns or the same resistance so that unequal loads are not thrown upon the rectifying units 21 and 22, and so that there will be no abnormal or irregular wave forms in the current of the load circuit. I also find it preferable in practice to have a ratio of approximately 4 to 1 or 5 to 1 between the number of turns in either end coil to the number of turns in the central coil 16a. This approximate ratio may be varied considerably, however, depending upon the characteristic regulation desired, and the conditions of different installations.

The regulating function of the control device 18 arises from the interaction of the alternating current fluxes and the direct current fluxes in the core structure of the device, whereby the permeability of the structure is modified in such manner that its impedance is caused to vary substantially in accordance with the demands in the load circuit. A clear understanding of the operation of the device can best be had by making certain more or less arbitrary distinctions between the alternating current fluxes and the direct current fluxes. It will therefore be understood that the following reference to three groups of fluxes interacting in the core structure is more or less arbitrary for the purpose of illustration, and is not limitative of the invention. First, with reference to the alternating current fluxes, it will be noted that an alternating current is being by-passed or shunted through the shunt impedance 31 during the entire operation of the apparatus, irrespective of the load drawn by the load circuit. This alternating current traverses both end coils 14a and 15a, being conducted from one coil to the other through the shunt impedance 31. The two coils are so wound that the alternating current fluxes created by this alternating current circulate in the same direction through the outer portions of the core structure, disregarding for the moment the circulation of these fluxes through the center leg. This alternating current flux is denoted by the wavy arrows $x$. Thus, during the alternation or half-cycle illustrated in Figure 1 when the alternating current is passing downwardly through the left end coil 14a and upwardly through the right end coil 15a, the alternating current flux $x$ is passing downwardly in the left leg 18l and is passing upwardly in the right leg 18r. Conversely, during the next alternation or half cycle illustrated in Figure 2, when the alternating current is passing downwardly through right coil 15a and upwardly through left coil 14a, the alternating current flux is passing downwardly in the right core leg and is passing upwardly in the left core leg. The foregoing reference to the alternating current flux passing upwardly or downwardly through one end leg corresponding to the flow of the alternating current upwardly or downwardly through the coil on that leg is purely arbitrary for facility of description, and in practice the reverse of this may follow from a reversed relation of the two end windings.

Referring now to the direct current fluxes set up by the two end coils, it will be evident that during the alternation illustrated in Figure 1 there is a component of direct current passing down through the left coil 14a and down through the rectifier unit 21 to the load circuit. This direct current component flowing through said winding sets up a flux which may be referred to as a direct current flux. Similarly, during the other alternation illustrated in Figure 2, there is a component of direct current passing down through the right coil 15a and through the rectifying unit 22 to the load circuit. This direct current component likewise sets up what may be termed a direct current flux in the core structure. These direct current fluxes set up in each case by the two end coils are denoted by the solid straight arrows $y$.

Referring now to the flux which is created by the direct current flowing through the central coil 16a, this flux is unidirectional at all times through the central leg 18c of the core structure, and is denoted by the dotted straight arrows $z$. The central coil is so wound that the direct current flux $z$ created thereby flows in a direction which is additive with respect to the direct current flux $y$ in one end leg and which is subtractive with respect to the alternating current flux $x$ in the other end leg. For example, during the half cycle illustrated in Figure 1, the direct current flux $z$ is additive with respect to the direct current flux $y$ in the left leg 18l, and is subtractive with respect to the alternating current flux $x$ in the right leg 18r. Conversely, during the alternation illustrated in Figure 2, the direct current flux $z$ is additive with respect to the direct current flux $y$ in the right leg 18r and is subtractive with respect to the alternating current flux $x$ in left leg 18l.

It will be seen that the value of the alternating current flux $x$ is relatively constant throughout the entire operation of the apparatus, being dependent upon the value of the shunt impedance 31 and being more or less independent of changing load demands in the load circuit. This alternating current flux serves to establish or maintain a desired flux density in the core structure. As previously remarked, the amount of this alternating current flux which is allowed to travel through the central leg 18c of the core can be adjusted by adjusting the resistance 34 in order to change the choke value of the coil 33. The direct current fluxes $y$ and $z$, on the other hand, are directly subject to the demands of the load circuit. This will be obvious from the fact that an increased current flow in the load circuit necessarily involves the flow of increased direct current components alternatively in the two end coils and the flow of a larger unidirectional current in the central coil 16a. Hence, it will be seen that as the current in the load circuit increases, the direct current fluxes $y$ and $z$ act cumulatively in the core structure to increase the flux density in the end legs of the core, this increase of flux density lowering the effective permeability of those portions of the core structure directly within the two alternating current coils 14a and 15a and decreasing the impedance in these coils. That is to say, during the alternation illustrated in Figure 1, the permeability of the left leg 18l of the core structure is reduced, and during the alternation illustrated in Figure 2 the permeability of the right leg 18r is reduced. The decreased impedance of the coils on these legs means the transmission of a higher potential to the load circuit, or a compensation for some or all of the drop of potential which would ordinarily result from the higher current flow in the load circuit.

For the purpose of reducing the induced alternating current component in central coil 16a, resistor 34 should be set for the lowest effective external resistance which will give the desired performance curve. In many applications, resistor 34 is replaced by a short circuiting jumper.

Coil 33 and associated resistor 34 or shorting jumper tend to keep the flux through leg 18c at a constant value. When coil 16a is omitted—as in certain applications of low impedance rectifiers—coil 33 and associated jumper keep the remanent direct current induction at a considerably higher value. This higher value of direct current induction "holds" the alternating current permeability of the structure lower with a resultant higher voltage for the rectifier elements and a higher load voltage for a given current.

In Figure 3 I have shown a modified arrangement wherein electronic tubes 41 and 42 are employed as the rectifying units. These tubes are preferably of the low impedance type, such as Tungar tubes. The cathodes of these tubes may be energized from any separate source of current supply, or may be energized from small secondary windings 43 and 44 on the power transformer 11. The conductor 14 leading from alternating current coil 14a is connected to the anode of its associated tube 41, and the conductor 15 extending from the other alternating current coil 15a is connected to the anode of its associated tube 42. The shunt impedance 31 is connected across the conductors 14 and 15 below the alternating current coils, as before described. The two cathodes of the rectifier tubes are connected to each other by a conductor 23', from which one side 23 of the load circuit extends. The apparatus may be employed as a battery charger with the load circuit connected to a storage battery, as described of the preceding embodiment; or the apparatus may be employed as a battery eliminator. As illustrative of the latter, I have shown a conventional filter system 48 in the load circuit for supplying a non-pulsating direct current to any suitable load, represented at 51. Preferably, a bleeder load, such as a high resistance 52, is connected across the load circuit for maintaining a small load through the circuit when no current is being drawn by the device 51. For the purpose of facilitating the explanation of the curves of Figure 4, I have shown a double pole, double throw switch 53 connected with conductors 16 and 24 and with the direct current coil 16a. When the switch is in position 53r the coil 16a is included in circuit and when the switch is in position 53l the coil is out of circuit.

The curves shown in Figure 4 were taken on a rectifier and filter system with Tungar type rectifier tubes. The primary voltage of the transformer was constant during the test. The taps on the transformer primary 12, turns on the coils 14a, 15a, turns on shunt impedance 31, and value of bleeder load were not changed during this test.

Curve $C^1$ was taken with a jumper across coil 33 and with coil 16a connected to produce a flux $z$ which aided the fluxes $y$ produced by coils 14a and 15a.

Curve $C^2$ was taken with a jumper across coil 33, and with the switch 53 in position 53l, or no direct current turns on center leg 18c.

Curve $C^3$ was taken with center leg 18c free of windings, i. e., the resistor 34 was open-circuited and the switch 53 was in position 53l.

Curve $C^4$ was taken with a jumper across coil 33 and with the switch 53 in position 53r, but with coil 16a connected to produce a flux $z$ which opposed the fluxes $y$ produced by coils 14a and 15a.

A comparison of curves $C^1$ and $C^2$ will show the gain in overall performance by having the coil 16a on leg 18c. For certain applications a curve similar to $C^2$ is more desirable than $C^1$. For other applications a curve which would fall between the limits of $C^2$ and $C^3$ would be desirable. Curve $C^3$ has approximately the same slope and shape as a rectifier filter system which has no compensation for load.

A comparison of curve $C^1$ and curve $C^4$ shows the effect of the direct current flux $z$ in the core structure. Curve $C^1$ shows the effect when the flux $z$ aids the other direct current flux $y$, and curve $C^4$ shows the effect when the flux $z$ opposes the flux $y$.

In Figure 5 I have shown a modified construction using two core structures as the regulating reactor, which core structures are separated magnetically but are connected in parallel relation electrically. The two core structures 118 and 218 are preferably of the three-legged type, although other forms of closed core structures can be used in this embodiment. One alternating current coil 114a is wound on the center leg 118c of the core 118, and the other alternating current coil 115a is wound on the center leg 218c of the other core 218. These two alternating current coils are connected between the outside terminals of the transformer secondary 13 and the rectifying units 21 and 22, substantially as previously described. The shunt impedance 31 is connected across the two rectifying units, also as previously described.

The direct current coil is separated into two sections 116a and 216a, both mounted on the center legs of the core structures and both connected in series with each other and with the load circuit 23, 24.

The choke coil is likewise separated into two sections 133 and 233, both mounted on the center legs of the core structures and both connected in series with each other and with the adjustable resistor 134. Adjusting the resistance 134 varies the current in both coils and varies the amount of coupling between the two structures. In other respects, the circuit arrangement is like that shown in Figure 1.

The same general theory of operation previously described applies to this embodiment, with the possible exception that the two short-circuited coils or choke coils 133 and 233 perform a coupling function in this embodiment, as well as the function previously described. This embodiment may also be used as a battery eliminator.

In each of the above described embodiments, the point of intermediate potential for conductor 16 can be obtained by the use of an auto-transformer or possibly by the use of a resistor, instead of by the center tap on the transformer secondary 13. In this regard, an exact relation of center tap or mid-point is not essential; either end of the secondary 13 can produce a higher voltage than the other end. That is to say, an unbalanced relation of voltages is operative and practical where there is no objection to an uneven wave form in the load circuit, or where a sufficient degree of filtering action is present in the load circuit to smooth out an uneven wave form.

While I have illustrated and described what I regard to be the preferred embodiments of my invention, nevertheless it will be understood that such are merely exemplary and that numerous modifications and rearrangements may be made therein without departing from the essence of the invention.

I claim:—

1. In combination, an alternating current supply circuit, a direct current load circuit, rectifying means through which current is fed from said supply circuit to said load circuit and regulating apparatus responsive to the load in said load circuit for varying the impedance of said supply circuit, said regulating apparatus comprising two magnetic core structures, alternating current coils on said core structures energized by the alternating current of said supply circuit and by components of the current fed to said load circuit, direct current coils on said core structures connected in series with each other and with the load circuit, and choke coils on said core structures establishing a coupled relation between said core structures and controlling the permeability thereof.

2. In combination, an alternating current supply circuit, a direct current load circuit, rectifying means through which current is fed from said supply circuit to said load circuit and regulating apparatus responsive to the load in said load circuit for varying the impedance of said supply circuit, said regulating apparatus comprising two magnetic core structures, alternating current coils on said core structures energized alternatively by components of the current fed to said load circuit, a shunt impedance connecting said coils for causing them to be energized by the alternating current of said supply circuit, direct current coils on said core structures connected in series with each other and with the load circuit, and choke coils on said core structures establishing a coupled relation between said core structures and controlling the permeability thereof.

STANLEY M. HANLEY.